(12) United States Patent
Liu

(10) Patent No.: US 11,489,451 B1
(45) Date of Patent: Nov. 1, 2022

(54) POWER CONVERSION APPARATUS AND SYNCHRONOUS RECTIFICATION CONTROLLER THEREOF

(71) Applicant: Power Forest Technology Corporation, Hsinchu County (TW)

(72) Inventor: Chia-Hsien Liu, Chiayi County (TW)

(73) Assignee: Power Forest Technology Corporation, Hsinchu County (TW)

( * ) Notice: Subject to any disclaimer, the term of this patent is extended or adjusted under 35 U.S.C. 154(b) by 0 days.

(21) Appl. No.: 17/406,049

(22) Filed: Aug. 18, 2021

(30) Foreign Application Priority Data

May 3, 2021 (TW) ................................. 110115947

(51) Int. Cl.
*H02M 3/335* (2006.01)

(52) U.S. Cl.
CPC ............................ *H02M 3/33592* (2013.01)

(58) Field of Classification Search
CPC .................................................. H02M 3/33592
See application file for complete search history.

(56) References Cited

U.S. PATENT DOCUMENTS

| 10,348,212 B2 * | 7/2019 | Kikuchi ............ H02M 3/33592 |
| 2019/0222134 A1 * | 7/2019 | Kikuchi ............ H02M 3/33592 |

* cited by examiner

*Primary Examiner* — Adolf D Berhane
*Assistant Examiner* — Afework S Demisse
(74) *Attorney, Agent, or Firm* — JCIPRNET

(57) ABSTRACT

A power conversion apparatus and a synchronous rectification (SR) controller thereof are provided. An open-loop control circuit outputs a clamp voltage as a driving voltage when a drain voltage of a synchronous rectification transistor rises to a second voltage, so as to quickly pull down the driving voltage and maintain the driving voltage at a clamp voltage. Therefore, a second control circuit may quickly turn off the synchronous rectification transistor when the drain voltage is greater than a third voltage.

10 Claims, 3 Drawing Sheets

POWER CONVERSION APPARATUS AND SYNCHRONOUS RECTIFICATION CONTROLLER THEREOF

CROSS-REFERENCE TO RELATED APPLICATION

This application claims the priority benefit of Taiwan application serial no. 110115947, filed on May 3, 2021. The entirety of the above-mentioned patent application is hereby incorporated by reference herein and made a part of this specification.

BACKGROUND

Technical Field

The disclosure relates to a power supply, in particular to a power conversion apparatus and a synchronous rectification controller thereof.

Description of Related Art

The power conversion apparatus is an indispensable component in modern electronic apparatus. In a power conversion apparatus based on pulse width modulation (PWM) control, the secondary side of the power conversion apparatus usually has a rectifier diode. Since the power consumption of the rectifier diode in the on-state is relatively large, a synchronous rectification transistor with a lower on-state resistance may be used to replace the rectification diode. Under this structure, a synchronous rectification controller is needed to control the turn-on and turn-off of the synchronous rectification transistor of the secondary side.

As the operating frequency of present power systems increases, the requirements for the control speed and accuracy switching to the on-state of the synchronous rectification transistor are getting higher. How to improve the turn-off speed of the synchronous rectification transistor becomes an issue to work on.

SUMMARY

The disclosure provides a power conversion apparatus and a synchronous rectification controller thereof, capable of effectively improving control speed and accuracy switching to on-state of a synchronous rectification transistor.

The synchronous rectification controller of the disclosure is configured to drive the synchronous rectification transistor. The synchronous rectification controller includes a first control circuit, an open-loop control circuit, and a second control circuit. The first control circuit is coupled to a drain terminal of the synchronous rectification transistor to receive a drain voltage, and compares the drain terminal with a first voltage. When the drain voltage is lower than the first voltage, the first control circuit outputs an on-state voltage as a driving voltage to drive the synchronous rectification transistor into an on-state. The open-loop control circuit is coupled to the drain terminal of the synchronous rectification transistor to receive the drain voltage. The open-loop control circuit outputs a clamp voltage as the driving voltage when the drain voltage rises to a second voltage to pull down the driving voltage and maintain the driving voltage at a clamp voltage. The second control circuit is coupled to the drain terminal of the synchronous rectification transistor to receive the drain voltage, and compares the drain terminal with a third voltage. When the drain voltage is greater than the third voltage, the second control circuit outputs a turn-off voltage as the driving voltage to drive the synchronous rectification transistor into a turn-off state.

According to an embodiment of the disclosure, when the drain voltage is lower than the third voltage, the second control circuit stops outputting the turn-off voltage.

According to an embodiment of the disclosure, the first control circuit includes a comparator circuit having a first input terminal, a second input terminal and an output terminal. The first input terminal is coupled to the drain terminal of the synchronous rectification transistor to receive the drain voltage, the second input terminal is coupled to the first voltage, and the output terminal is coupled to and provides the on-state voltage to a gate terminal of the synchronous rectification transistor.

According to an embodiment of the disclosure, the open-loop control circuit includes an analog-to-digital conversion circuit and a digital-to-analog conversion circuit. The analog-to-digital conversion circuit is coupled to the drain terminal of the synchronous rectification transistor to receive the drain voltage, and generates a digital control signal according to the drain voltage The digital-to-analog conversion circuit is coupled to the analog-to-digital conversion circuit, and generates the clamp voltage according to the digital control signal.

According to an embodiment of the disclosure, the analog-to-digital conversion circuit includes a comparator circuit having a first input terminal, a second input terminal and an output terminal. The first input terminal is coupled to the drain terminal of the synchronous rectification transistor to receive the drain voltage, the second input terminal is coupled to the second voltage, and the output terminal is coupled to and provides the digital control signal to the digital-to-analog conversion circuit.

According to an embodiment of the disclosure, the open-loop control circuit includes a comparator circuit having a first input terminal, a second input terminal and an output terminal. The first input terminal is coupled to the drain terminal of the synchronous rectification transistor to receive the drain voltage, the second input terminal is coupled to the second voltage, and the output terminal is coupled to and provides the clamp voltage to the synchronous rectification transistor.

According to an embodiment of the disclosure, the second control circuit includes a comparator circuit having a first input terminal, a second input terminal and an output terminal. The first input terminal is coupled to the drain terminal of the synchronous rectification transistor to receive the drain voltage, the second input terminal is coupled to the third voltage, and the output terminal is coupled to and provides the turn-off voltage to a gate terminal of the synchronous rectification transistor.

According to an embodiment of the disclosure, the first voltage, the second voltage, and the third voltage are negative DC voltages, and the first voltage is lower than the second voltage, and the second voltage is lower than the third voltage.

According to an embodiment of the disclosure, the clamp voltage is lower than the on-state voltage provided by the first control circuit and greater than the turn-off voltage provided by the second control circuit.

The disclosure also provides a power conversion apparatus including a transformer, a synchronous rectification transistor, and a synchronous rectification controller. The transformer has a primary side and a secondary side. A first terminal of the primary side is configured to receive an input voltage, and a first terminal of the secondary side is configured to provide an output voltage to a load. A drain terminal of the synchronous rectification transistor is coupled to a second terminal of the secondary side, a source terminal of the synchronous rectification transistor is coupled to a ground terminal, and a gate terminal of the synchronous rectification transistor is configured to receive a driving voltage. The synchronous rectification controller includes a first control circuit, an open-loop control circuit, and a second control circuit. The first control circuit is coupled to the drain terminal of the synchronous rectification transistor to receive the drain voltage, and compares the drain terminal with a first voltage. When the drain voltage is lower than the first voltage, the first control circuit outputs an on-state voltage as a driving voltage to drive the synchronous rectification transistor into an on-state. The open-loop control circuit is coupled to the drain terminal of the synchronous rectification transistor to receive the drain voltage. The open-loop control circuit outputs a clamp voltage as the driving voltage when the drain voltage rises to a second voltage to pull down the driving voltage and maintain the driving voltage at a clamp voltage The second control circuit is coupled to the drain terminal of the synchronous rectification transistor to receive the drain voltage, and compares the drain terminal with a third voltage. When the drain voltage is greater than the third voltage, the second control circuit outputs a turn-off voltage as the driving voltage to drive the synchronous rectification transistor into a turn-off state.

Based on the above, the open-loop control circuit according to the embodiments of the disclosure may output the clamp voltage as the driving voltage when the drain voltage of the synchronous rectification transistor rises to the second voltage to pull down the driving voltage and maintain the driving voltage at a clamp voltage, and then the second control circuit may quickly turn off the synchronous rectification transistor when the drain voltage is greater than the third voltage, thereby effectively improving the control speed and accuracy switching to the on-state of the synchronous rectification transistor.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
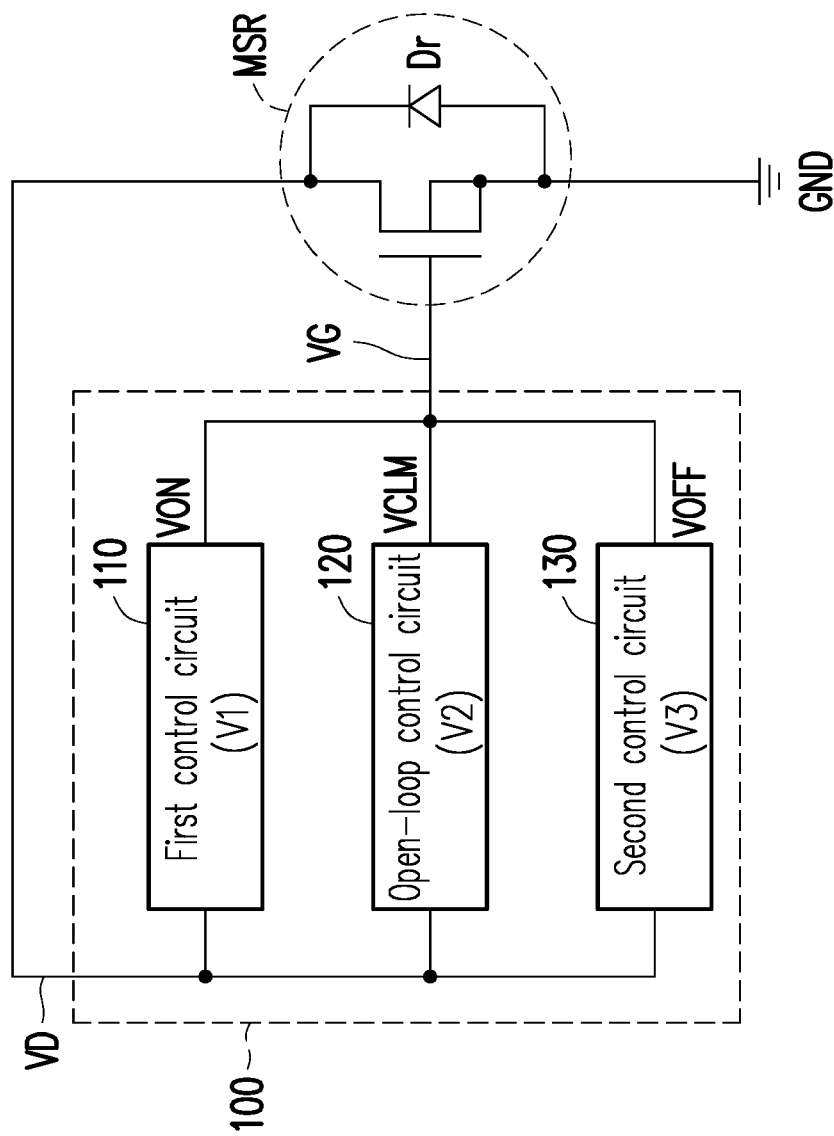
FIG. 1 is a schematic circuit block diagram of a synchronous rectification controller according to an embodiment of the disclosure.

In order to make the content of the disclosure more comprehensible, embodiments in which the disclosure may be implemented are listed as follows. In addition, wherever possible, elements/components/steps with the same reference numerals in the drawings and embodiments represent the same or similar components.

With reference to FIG. 1, FIG. 1 is a schematic circuit block diagram of a synchronous rectification controller according to an embodiment of the disclosure. A synchronous rectification controller 100 may be applied to a secondary side of a power conversion apparatus (not shown) to drive a synchronous rectification transistor MSR of the secondary side. Structure of the power conversion apparatus may be flyback, push-pull, forward, half-bridge, full-bridge or other types of structures. The disclosure does not limit the structure of the power conversion apparatus.

In detail, the synchronous rectification controller 100 is coupled to a drain terminal of the synchronous rectification transistor MSR to receive a drain voltage VD, and is coupled to a gate terminal of the synchronous rectification transistor MSR to control the turn-on and turn-off of the synchronous rectification transistor MSR. In addition, a source terminal and a body terminal of the synchronous rectification transistor MSR are coupled to a ground terminal GND. A parasitic diode Dr is disposed between the drain terminal and the body terminal of the synchronous rectification transistor MSR. According to an embodiment of the disclosure, the synchronous rectification transistor MSR may be an N-type metal-oxide-semiconductor field-effect transistor, but the disclosure is not limited thereto, and depends on actual application or design requirements.

The synchronous rectification controller 100 may include a first control circuit 110, an open-loop control circuit 120, and a second control circuit 130. The first control circuit 110 is coupled to the drain terminal of the synchronous rectification transistor MSR to receive the drain voltage VD, and an output terminal of the first control circuit 110 is coupled to the gate terminal of the synchronous rectification transistor MSR. The first control circuit 110 may compare the drain voltage VD with a first voltage V1. When the drain voltage VD is lower than the first voltage V1, the first control circuit 110 outputs an on-state voltage VON as a driving voltage VG to turn on the synchronous rectification transistor MSR.

The open-loop control circuit 120 is coupled to the drain terminal of the synchronous rectification transistor MSR to receive the drain voltage VD, and an output terminal of the open-loop control circuit 120 is coupled to the gate terminal of the synchronous rectification transistor MSR. The open-loop control circuit 120 may generate a clamp voltage VCLM as the driving voltage VG according to the drain voltage VD and a second voltage V2. When the drain voltage VD rises to the second voltage V2, the open-loop control circuit 120, which has an open-loop characteristic with a faster response speed, may quickly pull down the driving voltage VG and maintain the driving voltage VG at the clamp voltage VCLM.

The second control circuit 130 is coupled to the drain terminal of the synchronous rectification transistor MSR to receive the drain voltage VD, and an output terminal of the second control circuit 130 is coupled to the gate terminal of the synchronous rectification transistor MSR. The second control circuit 130 may compare the drain voltage VD with a third voltage V3. When the drain voltage VD rises to be greater than the third voltage V3, since the driving voltage VG has been pulled down in advance to the clamp voltage VCLM by the open-loop control circuit 120, the second control circuit 130 may output a turn-off voltage VOFF as the driving voltage VG, and quickly turn off the synchronous rectification transistor MSR. In addition, when the drain voltage VD is lower than the third voltage V3, the second control circuit 130 stops outputting the turn-off voltage VOFF, that is, the output terminal of the second control circuit 130 is in a high-impedance state.

According to an embodiment of the disclosure, the first voltage V1, the second voltage V2, and the third voltage V3 may be negative DC voltages, but the disclosure is not limited thereto.

According to an embodiment of the disclosure, the first voltage V1 is lower than the second voltage V2, and the second voltage V2 is lower than the third voltage V3.

Figure 2:
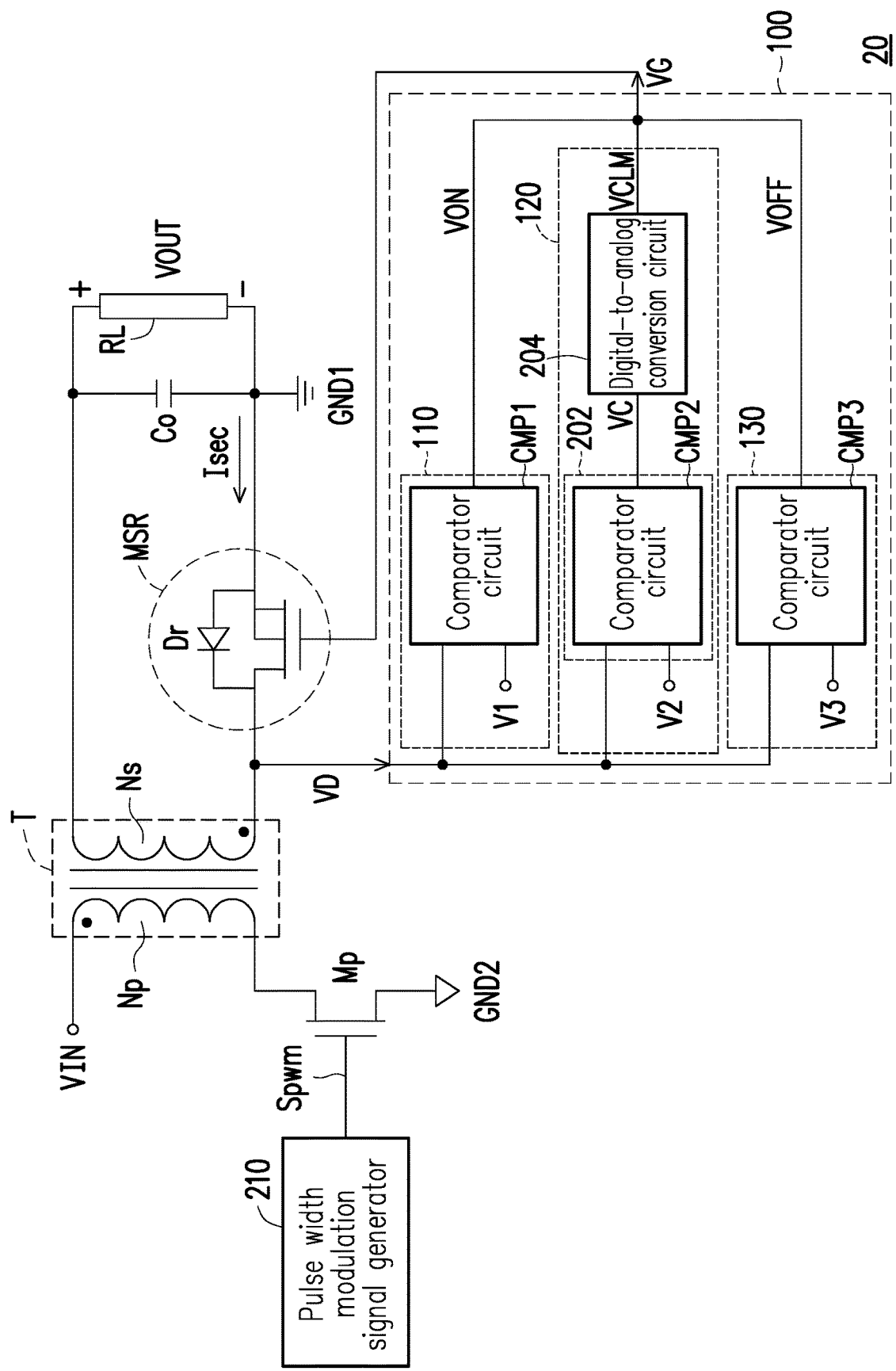
FIG. 2 is a schematic circuit diagram of a power conversion apparatus according to an embodiment of the disclosure.
Figure 3:
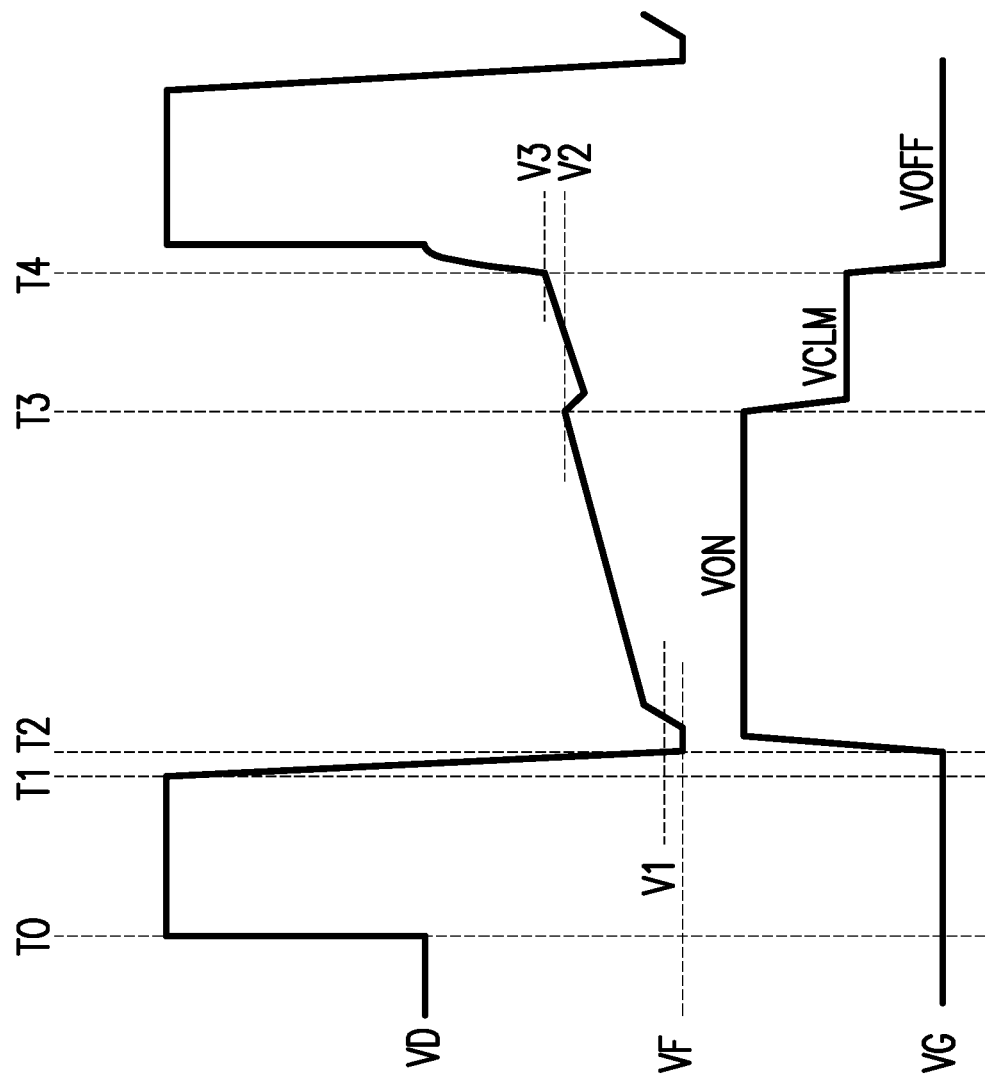
FIG. 3 is a schematic sequence diagram of signal of the synchronous rectification controller and a synchronous rectification transistor.

A more detailed description will be given below. For the convenience of description, the power conversion apparatus is regarded as the flyback structure for description herein, and that the power conversion apparatus is regarded as other structures can be inferred from this. With reference to FIG. 2 and FIG. 3., FIG. 2 is a schematic circuit diagram of a power conversion apparatus 20 according to an embodiment of the disclosure, and FIG. 3 is a schematic sequence diagram of signal of the synchronous rectification controller 100 and the synchronous rectification transistor MSR of FIG. 2. The power conversion apparatus 20 includes a transformer T, the synchronous rectification transistor MSR, the synchronous rectification controller 100, a power switch Mp, and a pulse width modulation signal generator 210, but is not limited thereto. The transformer T includes a primary side Np and a secondary side Ns. A first terminal of the primary side Np (for example, a common-polarity terminal, that is, a dotted terminal) is configured to receive an input voltage VIN, and a first terminal of the secondary side Ns (for example, an opposite-polarity terminal, that is, a non-dotted terminal) is configured to provide an output voltage VOUT to a load RL (for example, an electronic apparatus), but is not limited thereto.

A first terminal of the power switch Mp is coupled to a second terminal of the primary side Np (for example, an opposite-polarity terminal). A second terminal of the power switch Mp is coupled to a second ground terminal GND2, and a control terminal of the power switch Mp is coupled to the pulse width modulation signal generator 210 to receive a pulse width modulation signal Spwm. The pulse width modulation signal generator 210 may generate and adjust the pulse width modulation signal Spwm according to state of the load RL (or power supplying requirement).

The drain terminal of the synchronous rectification transistor MSR is coupled to a second terminal of the secondary side Ns (for example, a common-polarity terminal). The source terminal and the body terminal of the synchronous rectification transistor MSR are coupled to a first ground terminal GND1. The parasitic diode Dr is disposed between the drain terminal and the body terminal of the synchronous rectification transistor MSR. The synchronous rectification controller 100 is coupled to the drain terminal of the synchronous rectification transistor MSR to receive the drain voltage VD. The synchronous rectification controller 100 may correspondingly generate the driving voltage VG to the gate terminal of the synchronous rectification transistor MSR according to a voltage level of the drain voltage VD to control the synchronous rectification transistor MSR. The synchronous rectification controller 100 includes the first control circuit 110, the open-loop control circuit 120, and the second control circuit 130, and coupling manner thereof may be referred to the related description of FIG. 1 above.

At a time point T0 shown in FIG. 3, the power switch Mp is turned on, and the input voltage VIN provides power to a coil of the primary side Np of the transformer T for energy storage. The voltage level of the drain voltage VD is K×VIN, where K is a coil ratio of the secondary side Ns to the primary side Np of the transformer T. At this time, the parasitic diode Dr of the synchronous rectification transistor MSR is reverse bias and is turned off. Since the voltage level of the drain voltage VD is greater than the first voltage V1 and the third voltage V3, the first control circuit 110 will not provide the on-state voltage VON, and the second control circuit 130 provides, for example, the turn-off voltage VOFF that is in a low voltage level as the driving voltage VG to maintain the synchronous rectification transistor MSR in a turn-off state.

At a time point T1, the power switch Mp is turned off in response to the pulse width modulation signal Spwm generated by the pulse width modulation signal generator 210. Based on Lenz's law, energy stored in the primary side Np of the transformer T will be transferred to the secondary side Ns of the transformer T. At the same time, the parasitic diode Dr of the synchronous rectification transistor MSR is turned on under forward bias. Since the body terminal of the synchronous rectification transistor MSR is coupled to the first ground terminal GND1, a voltage level of the drain terminal of the synchronous rectification transistor MSR (that is, the drain voltage VD) will begin to decrease from K×VIN to a negative voltage value VF. When the second control circuit 130 determines that the drain voltage VD decreases to be lower than the third voltage V3, the second control circuit 130 stops providing the turn-off voltage VOFF.

In addition, when the drain voltage VD decreases to be lower than the first voltage V1 (at a time point T2), the first control circuit 110 continuously outputs the on-state voltage VON that is in a high voltage level as the driving voltage VG to quickly turn on the synchronous rectification transistor MSR, so that the parasitic diode Dr is quickly turned off. Compared with a general synchronous rectification controller that gradually raises the driving voltage VG to high voltage level, the driving manner of the first control circuit 110 according to this embodiment may effectively shorten a turn-on time of the parasitic diode Dr, thereby improving the overall conversion efficiency of the power conversion apparatus 20. Therefore, a current Isec of the secondary side Ns of the transformer T will charge a capacitor Co through a channel induced in the synchronous rectification transistor MSR, and supply the DC output voltage VOUT to the load RL.

As the energy transferred to the secondary side Ns of the transformer T continues to charge the capacitor Co, the current Isec of the secondary side Ns will continue to decrease, causing the voltage level of the drain voltage VD to gradually increase from the negative voltage value VF. When the voltage level of the drain voltage VD rises to the second voltage V2, as shown at a time point T3, the open-loop control circuit 120 continuously outputs the clamp voltage VCLM as the driving voltage VG to pull down the driving voltage VG and maintain the driving voltage VG at the clamp voltage VCLM. Since open-loop circuit has a faster response speed than closed-loop circuit, the clamp voltage VCLM provided by the open-loop control circuit 120 may quickly pull down the driving voltage VG and maintain the driving voltage VG at the clamp voltage VCLM.

When the voltage level of the drain voltage VD rises to be greater than the third voltage V3, as shown at a time point T4, at this time, the energy stored in the transformer T has been completely transferred to the capacitor Co, so the current Isec of the secondary side Ns decreases to zero, and the second control circuit 130 will generate, for example, the turn-off voltage VOFF that is in a low voltage level as the driving voltage VG to turn off the synchronous rectification transistor MSR. Since a gate terminal voltage has been pulled down in advance to the clamp voltage VCLM by the open-loop control circuit 120, the second control circuit 130 may quickly turn off the synchronous rectification transistor MSR, and reduce delay time of turning off the synchronous rectification transistor MSR, thereby improving control speed and accuracy switching to on-state of the synchronous rectification transistor MSR, and further improving the overall conversion efficiency of the power conversion apparatus 20.

The implementation of the first control circuit 110, the open-loop control circuit 120, and the second control circuit 130 will be described as follows.

According to an embodiment of the disclosure, the first control circuit 110 may include a comparator circuit CMP1, but the disclosure is not limited thereto. The comparator circuit CMP1 has a first input terminal, a second input terminal and an output terminal. The first input terminal of the comparator circuit CMP1 is coupled to the drain terminal of the synchronous rectification transistor MSR to receive the drain voltage VD. The second input terminal of the comparator circuit CMP1 is coupled to the first voltage V1. The output terminal of the comparator circuit CMP1 is coupled to and provides the driving voltage VG to the gate terminal of the synchronous rectification transistor MSR. Operation of the comparator circuit CMP1 can be inferred with reference to the operation of the first control circuit 110, and therefore will not be repeated in the following.

According to an embodiment of the disclosure, the open-loop control circuit 120 may include an analog-to-digital conversion circuit 202 and a digital-to-analog conversion circuit 204. The analog-to-digital conversion circuit 202 is coupled to the drain terminal of the synchronous rectification transistor MSR, the second voltage V2, and the digital-to-analog conversion circuit 204. The digital-to-analog conversion circuit 204 is coupled to the gate terminal of the synchronous rectification transistor MSR. The analog-to-digital conversion circuit 202 may generate a digital control signal VC according to the drain voltage VD to the digital-to-analog conversion circuit 204 to control the digital-to-analog conversion circuit 204 to continuously generate the clamp voltage VCLM when the voltage level of the drain voltage VD rises to the second voltage V2. The digital-to-analog conversion circuit 204 may be implemented by, for example, a comparator circuit CMP2, but is not limited thereto. The comparator circuit CMP2 has a first input terminal, a second input terminal and an output terminal. The first input terminal of the comparator circuit CMP2 is coupled to the drain terminal of the synchronous rectification transistor MSR to receive the drain voltage VD. The second input terminal of the comparator circuit CMP2 is coupled to the second voltage V2. The output terminal of the comparator circuit CMP2 is coupled to and provides the digital control signal VC to the digital-to-analog conversion circuit 204 to control the digital-to-analog conversion circuit 204 to generate the clamp voltage VCLM. Operation of the comparator circuit CMP2 and the digital-to-analog conversion circuit 204 can be inferred with reference to the operation of the open-loop control circuit 120, and therefore will not be repeated in the following. Since the comparator circuit CMP2 has an open-loop characteristic, compared to using an operational amplifier, the comparator circuit CMP2 may more quickly control the digital-to-analog conversion circuit 204 to generate the clamp voltage VCLM, and pull down the driving voltage VG and maintain the driving voltage VG at the clamp voltage VCLM.

It should be noted that according to some embodiments, the open-loop control circuit 120 may not include the digital-to-analog conversion circuit 204, and the comparator circuit CMP2 directly provides the clamp voltage VCLM to the gate terminal of the synchronous rectification transistor MSR according to the drain voltage VD and the second voltage V2 to pull down the driving voltage VG and maintain the driving voltage VG at the clamp voltage VCLM.

According to an embodiment of the disclosure, the second control circuit 130 may include a comparator circuit CMP3, but the disclosure is not limited thereto. The comparator circuit CMP3 has a first input terminal, a second input terminal and an output terminal. The first input terminal of the comparator circuit CMP3 is coupled to the drain terminal of the synchronous rectification transistor MSR to receive the drain voltage VD. The second input terminal of the comparator circuit CMP3 is coupled to the third voltage V3. The output terminal of the comparator circuit CMP3 is coupled to and provides the driving voltage VG to the gate terminal of the synchronous rectification transistor MSR. Operation of the comparator circuit CMP3 can be inferred with reference to the operation of the second control circuit 130, and therefore will not be repeated in the following.

In summary, the open-loop control circuit according to the embodiments of the disclosure may output the clamp voltage as the driving voltage when the drain voltage of the synchronous rectification transistor rises to the second voltage to pull down the driving voltage and maintain the driving voltage at a clamp voltage, and then the second control circuit may quickly turn off the synchronous rectification transistor when the drain voltage is greater than the third voltage, thereby effectively improving the control speed and accuracy switching to the on-state of the synchronous rectification transistor.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A synchronous rectification controller for driving a synchronous rectification transistor comprising:
   a first control circuit coupled to a drain terminal of the synchronous rectification transistor to receive a drain voltage, comparing the drain terminal with a first voltage, wherein when the drain voltage is lower than the first voltage, the first control circuit outputs an on-state voltage as a driving voltage to drive the synchronous rectification transistor into an on-state;
   an open-loop control circuit coupled to the drain terminal of the synchronous rectification transistor to receive the drain voltage, wherein the open-loop control circuit outputs a clamp voltage as the driving voltage when the drain voltage rises to a second voltage to pull down the driving voltage and maintain the driving voltage at a clamp voltage; and
   a second control circuit coupled to the drain terminal of the synchronous rectification transistor to receive the drain voltage, comparing the drain terminal with a third voltage, wherein when the drain voltage is greater than the third voltage, the second control circuit outputs a turn-off voltage as the driving voltage to drive the synchronous rectification transistor into a turn-off state.

2. The synchronous rectification controller according to claim 1, wherein when the drain voltage is lower than the third voltage, the second control circuit stops outputting the turn-off voltage.

3. The synchronous rectification controller according to claim 1, wherein the first control circuit comprises:
  a comparator circuit having a first input terminal, a second input terminal and an output terminal, wherein the first input terminal is coupled to the drain terminal of the synchronous rectification transistor to receive the drain voltage, the second input terminal is coupled to the first voltage, and the output terminal is coupled to and provides the on-state voltage to a gate terminal of the synchronous rectification transistor.

4. The synchronous rectification controller according to claim 1, wherein the open-loop control circuit comprises:
  an analog-to-digital conversion circuit coupled to the drain terminal of the synchronous rectification transistor to receive the drain voltage, generating a digital control signal according to the drain voltage: and
  a digital-to-analog conversion circuit coupled to the analog-to-digital conversion circuit, generating the clamp voltage according to the digital control signal.

5. The synchronous rectification controller according to claim 4, wherein the analog-to-digital conversion circuit comprises:
  a comparator circuit having a first input terminal, a second input terminal and an output terminal, wherein the first input terminal is coupled to the drain terminal of the synchronous rectification transistor to receive the drain voltage, the second input terminal is coupled to the second voltage, and the output terminal is coupled to and provides the digital control signal to the digital-to-analog conversion circuit.

6. The synchronous rectification controller according to claim 1, wherein the open-loop control circuit comprises:
  a comparator circuit having a first input terminal, a second input terminal and an output terminal, wherein the first input terminal is coupled to the drain terminal of the synchronous rectification transistor to receive the drain voltage, the second input terminal is coupled to the second voltage, and the output terminal is coupled to and provides the clamp voltage to the synchronous rectification transistor.

7. The synchronous rectification controller according to claim 1, wherein the second control circuit comprises:
  a comparator circuit having a first input terminal, a second input terminal and an output terminal, wherein the first input terminal is coupled to the drain terminal of the synchronous rectification transistor to receive the drain voltage, the second input terminal is coupled to the third voltage, and the output terminal is coupled to and provides the turn-off voltage to a gate terminal of the synchronous rectification transistor.

8. The synchronous rectification controller according to claim 1, wherein the first voltage, the second voltage, and the third voltage are negative DC voltages, and the first voltage is lower than the second voltage, and the second voltage is lower than the third voltage.

9. The synchronous rectification controller according to claim 1, wherein the clamp voltage is lower than the on-state voltage provided by the first control circuit and greater than the turn-off voltage provided by the second control circuit.

10. A power conversion apparatus comprising:
  a transformer having a primary side and a secondary side, wherein a first terminal of the primary side is configured to receive an input voltage, and a first terminal of the secondary side is configured to provide an output voltage to a load;
  a synchronous rectification transistor, wherein a drain terminal of the synchronous rectification transistor is coupled to a second terminal of the secondary side, a source terminal of the synchronous rectification transistor is coupled to a ground terminal, and a gate terminal of the synchronous rectification transistor is configured to receive a driving voltage; and
  a synchronous rectification controller comprising:
    a first control circuit coupled to the drain terminal of the synchronous rectification transistor to receive a drain voltage, comparing the drain terminal with a first voltage, wherein when the drain voltage is lower than the first voltage, the first control circuit outputs an on-state voltage as a driving voltage to drive the synchronous rectification transistor into an on-state;
    an open-loop control circuit coupled to the drain terminal of the synchronous rectification transistor to receive the drain voltage, wherein the open-loop control circuit outputs a clamp voltage as the driving voltage when the drain voltage rises to a second voltage to pull down the driving voltage and maintain the driving voltage at a clamp voltage; and
    a second control circuit coupled to the drain terminal of the synchronous rectification transistor to receive the drain voltage, comparing the drain terminal with a third voltage, wherein when the drain voltage is greater than the third voltage, the second control circuit outputs a turn-off voltage as the driving voltage to drive the synchronous rectification transistor into a turn-off state.

* * * * *